UNITED STATES PATENT OFFICE.

OTTO BALTIN, OF LIPINE, GERMANY.

PROCESS FOR THE PRODUCTION OF ZINC.

1,261,342. Specification of Letters Patent. Patented Apr. 2, 1918.

No Drawing. Application filed February 25, 1914. Serial No. 820,953.

*To all whom it may concern:*

Be it known that I, OTTO BALTIN, a citizen of the German Empire, and resident of Lipine, Upper Silesia, Germany, have invented certain new and useful Improvements in Processes for the Production of Zinc, of which the following is a specification, such as will enable others skilled in the art to which it appertains to make and use the same.

In the reduction or distillation of zinc residues, oxid of zinc and other ores in a muffle it has under certain circumstances been found advantageous to briquet the ores preferably in such a form (*e. g.* oval, rounded, polygonal or the like) that the bricks touch each other at as small as possible number of points, so that large intercommunicating spaces are formed for the passing off of the reduction products of metallic vapors. The process of reducing zinc and other ores, as described above, is described in my co-pending application, Serial No. 810,166, filed January 3, 1914.

In raising the temperature of the muffle to a point suitable for free reduction or passage of vapors, melting or slagging of the ores of the briquets sometimes occurs. This is a serious drawback, as it causes the filling up of the spaces between the briquets thus obstructing the free passing of the reduction products.

There are ores which, either alone or in conjunction with the impurities set up by the reducing agents, will melt at a lower temperature than would otherwise be necessary for the reduction of the ores, and the like.

The object of the present invention is to obviate these drawbacks.

According to this invention and in order to successfully counteract the objectionable results of melting away or slagging of ores of the kind mentioned or of a mixture of ores and reducing agents certain substances are added to the brick muffle charge which prevent the bricks melting away or turning into dross.

One of such substances, for example, is naphthalin which is added in small quantities to the charge and which very considerably increases the refractory nature of the bricks. The addition of naphthalin is already known in the manufacture of so-called patent fuel, also the capability of the naphthalin to increase the fireproofness of bricks in itself is known, and this known capability is utilized with special advantages for the production of zinc.

There are, however, other substances besides naphthalin which can be effectively utilized in briqueting a muffle charge in order to obtain the desired result. It would be quite possible to use chalky or ferriferous additions, or such containing silicic acid. Briefly, all such additions can be used which result in the formation of silicates which are not easily fusible or in drosses not easily fusible in connection with the bases or acids contained in the ores or in the reducing agents.

What I claim and desire to secure by Letters Patent is:—

1. A process for the treatment of zinc ores, which consists in adding naphthalin to a mixture of the zinc ore and reducing agents; and briqueting the mixture.

2. A briquet comprising zinc ore; reduction material and naphthalin.

In witness whereof I have hereunto set my hand in the presence of two witnesses.

OTTO BALTIN.

Witnesses:
FANST REILLY,
ERNST BLEINST.

Copies of this patent may be obtained for five cents each, by addressing the "Commissioner of Patents, Washington, D. C."